US007420570B2

(12) United States Patent
Xu et al.

(10) Patent No.: US 7,420,570 B2
(45) Date of Patent: Sep. 2, 2008

(54) METHODS AND SYSTEMS FOR VIDEO PROCESSING USING SUPER DITHERING

(75) Inventors: Ning Xu, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 405 days.

(21) Appl. No.: 11/106,812

(22) Filed: Apr. 14, 2005

(65) Prior Publication Data

US 2006/0233438 A1 Oct. 19, 2006

(51) Int. Cl.

*G06K 9/00* (2006.01)
*G09G 5/10* (2006.01)
*H04N 5/66* (2006.01)
*H04N 7/26* (2006.01)
*H04B 1/66* (2006.01)
*H04N 7/32* (2006.01)
*G09G 5/28* (2006.01)

(52) U.S. Cl. ....................... 345/596; 345/589; 345/694; 382/251; 382/162; 358/3.13; 358/518

(58) Field of Classification Search ......... 345/589–606, 345/616, 618, 475, 549, 555, 690–694; 382/162–167, 382/251–253, 274; 358/3.01, 3.03, 3.06, 358/3.13, 518, 534; 348/45, 489, 490, 494; 375/240.01, 240.03, 240.22–27

See application file for complete search history.

(56) References Cited

U.S. PATENT DOCUMENTS 5,420,705 A * 5/1995 Ray ........................... 358/523
5,469,267 A * 11/1995 Wang ........................ 358/3.21
5,734,744 A * 3/1998 Wittenstein et al. ......... 382/166
6,026,180 A * 2/2000 Wittenstein et al. ......... 382/166
2004/0246278 A1* 12/2004 Elliott ........................ 345/692
2005/0069209 A1* 3/2005 Damera-Venkata et al. . 382/204
2006/0018559 A1* 1/2006 Kim et al. .................. 382/251
2006/0221366 A1* 10/2006 Daly et al. .................. 358/1.9

OTHER PUBLICATIONS

J. Jarvis, C. Judice, and W. Ninke, *A survey of techniques for the display of continuous tone pictures on bilevel displays*, Computer Graphics and Image Processing, pp. 13-40, 1976, vol. 5.

R. Ulichney, *Digital Halftoning*. Cambridge, Mass.: The MIT Press, 1987.

(Continued)

*Primary Examiner*—Wesner Sajous
(74) *Attorney, Agent, or Firm*—Kenneth L. Sherman, Esq.; Michael Zarrabian, Esq.; Myers Dawes Andras & Sherman, LLP

(57) ABSTRACT

A super dithering method of color video quantization maintains the perceived video quality on a display with less bit depth of color than the input video. Super dithering relies on both the spatial and temporal properties of human visual system, wherein spatial dithering is applied to account for human eye's low pass spatial property, while temporal dithering is applied to achieve the quantization level of the spatial dithering.

18 Claims, 6 Drawing Sheets

100

OTHER PUBLICATIONS

R. W. Floyd and L. Steinberg, *An adaptive algorithm for spatial grey scale*, in Proc. Soc. Inf. Display, 1976, pp. 75-77, vol. 17, No. 2.

V. Ostromoukhov, *A simple and efficient error-diffusion algorithm*, in Proceedings of SIGGRAPH 2001, pp. 567-572.

N. Damera-Venkata and B. Evans, *Design and analysis of vector color error diffusion halftoning systems*, IEEE Trans. Image Processing, Oct. 2001, pp. 1552-1565, vol. 10.

R. Adler, B. Kitchens, M. Martens, C. Tresser, and C. Wu, *The mathematics of halftoning*, IBM Journal of Research and Development, 2003, pp. 5-15, vol. 47, No. 1.

J. Mulligan, *Methods for spatiotemporal dithering*, SID 93 Digest, 1993, pp. 155-158.

C. Atkins, T. Flohr, D. Hilgenberg, C. Bouman, and J. Allebach, *Model-based color image sequence quantization*, in Proceedings of SPIE/SI&T Conf. on Human Vision, Visual Processing, and Digital display V, San Jose, CA, Feb. 1994, pp. 310-317, vol. 2179.

R. Ulichney, *Dithering with blue noise*, in Proceedings of IEEE, 1988, pp. 56-79, vol. 76.

B. Bayer, *An optimum method for two-level rendition of continuous-tone pictures*, in Conference Record of the Intl. Conf. on Communications, 1973, pp. 26-11-26-15.

* cited by examiner

150

200

300

400

500

METHODS AND SYSTEMS FOR VIDEO PROCESSING USING SUPER DITHERING

FIELD OF THE INVENTION

The present invention relates in general to video and image processing, and in particular to color quantization or re-quantization of video sequences to improve the video quality for bit-depth insufficient displays.

BACKGROUND OF THE INVENTION

The 24-bit RGB color space is commonly used in many display systems such as monitor, television etc. In order to be displayed on a 24-bit RGB display, images resulting from a higher precision capturing or processing system have to be first quantized to 3×8 bit RGB true color signals. In the past, this 24-bit color space is thought to be more than enough for color representation. However, as display technology advances and brightness level increases, consumers are no longer satisfied with existing 24-bit color displays.

Higher bit-depth displays, including the higher bit processing chips and drivers, are becoming a trend in the display industry. Still, most of the existing displays and the displays to be produced in the near future are 8-bits per channel. Representing color data with more than 8-bits per channel using these 8-bit displays and maintaining the video quality at the same time is highly desirable.

Attempts at using less bit images to represent more bit images have been around in printing community. Halftoning algorithms are used to transform continuous-tone images to binary images in order to be printed by either a laser or inkjet printer. Two categories of halftoning methods are primarily used: dithering and error diffusion. Both methods capitalize on the low pass characteristic of the human visual system, and redistribute quantization errors to the high frequencies which are less noticeable to a human viewer. The major difference between dithering and error diffusion is that dithering operates pixel-by-pixel based on the pixel's coordinate, and error diffusion algorithm operates based on a running error. Hardware implementation of halftoning by error diffusion requires more memory than by dithering.

Halftoning algorithms developed for printing can be used in representing more bit depth video using 8-bit video displays. In general, spatial dithering is applied to video quantization because it is both simple and fast. However, for video displays, the temporal dimension (time) makes it possible to exploit the human visual system's integration in the temporal domain to increase the precision of a color to be represented. One way of doing so is to generalize the existing two-dimensional dithering methods to three-dimensional spatiotemporal dithering, which includes using a three-dimensional dithering mask and combining a two dimensional spatial dithering algorithm with a temporal error diffusion. Also, error diffusion algorithms can be directly generalized to three dimensional with a three dimensional diffusion filter. These methods simply extend the two-dimensional halftoning methods to three-dimensional, and do not consider the temporal properties of human vision system. In addition, the methods with temporal error diffusion need frame memory which is expensive in hardware implementation.

BRIEF SUMMARY OF THE INVENTION

The present invention addresses the above short-comings. A super dithering method for color video quantization according to the present invention maintains the perceived video quality on a display with less bit depth of color than the input video. Super dithering relies on both the spatial and temporal properties human visual system, wherein spatial dithering is applied to account for human eye's low pass spatial property, while temporal averaging is applied to determine the quantization level of the spatial dithering.

In one embodiment, the present invention provides a color quantization method that combines a spatial dithering process with a data dependent temporal dithering process, for better perception results of high precision color video quantization. The size of temporal dithering (i.e., the number of frames considered for each pixel) is constrained by the frame rate of the video display. In one example, three frames for temporal dithering at the frame rate of 60 Hz are utilized. The temporal dithering is data dependent means wherein for different color values and different location, the temporal dithering scheme is different. Such a combined two dimensional spatial dithering and data dependent temporal dithering is super dithering according to the present invention, which first dithers the color value of each pixel to an intermediate quantization level and then uses temporal dithering to achieve this intermediate levels of color by dithering them to the final quantization level.

Other embodiments, features and advantages of the present invention will be apparent from the following specification taken in conjunction with the following drawings.

DETAILED DESCRIPTION OF THE INVENTION

Figure 1A:
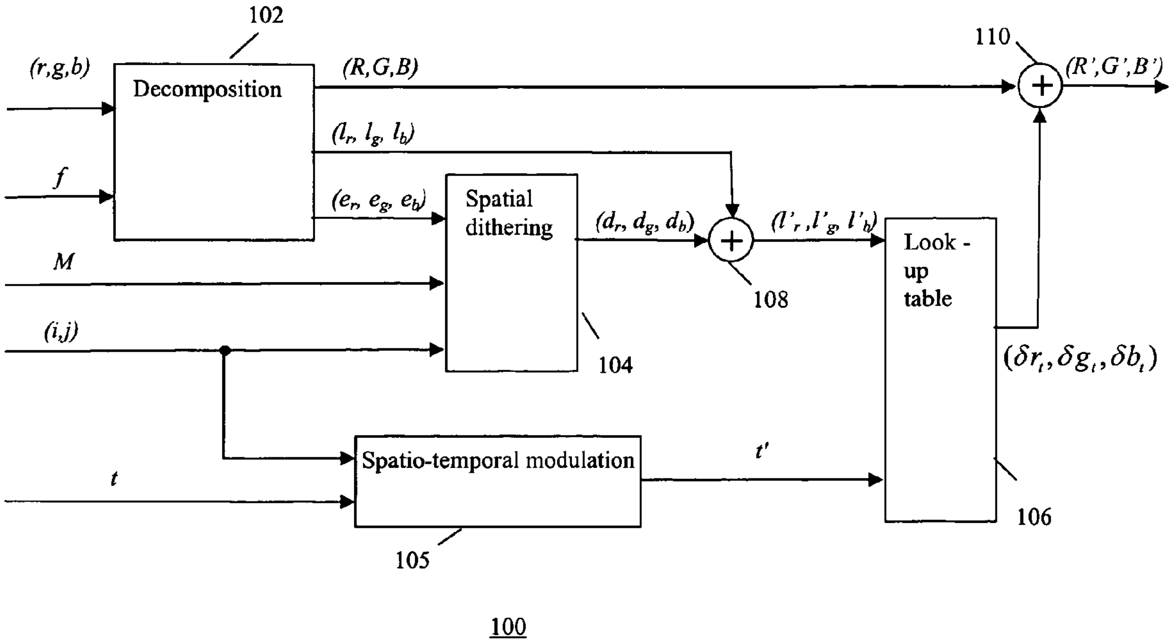
FIG. 1A shows an example color quantization system according to an embodiment of the present invention which quantizes an input color signal to a predefined quantization level of output signal.

A super dithering method for color video quantization according to the present invention maintains the perceived video quality on a display with less bit depth of color than the input video. Super dithering relies on both the spatial and temporal properties human visual system, wherein spatial dithering is applied to account for human eye's low pass spatial property, while temporal averaging is applied to determine the quantization level of the spatial dithering.

In one embodiment, the present invention provides a color quantization method that combines a two dimensional (2D) spatial dithering process with a data dependent temporal dithering process, for better perception results of high precision color video quantization. Other spatial dithering processes can also be used. The size of temporal dithering (i.e., the number of frames considered for each pixel) is constrained by the frame rate of the video display. In one example, three frames for temporal dithering at the frame rate of 60 Hz are utilized. The temporal dithering is data dependent means wherein for different color values and different location, the temporal dithering scheme is different. Such a combined two dimensional spatial dithering and data dependent temporal dithering is termed super dithering (further described hereinbelow), which first dithers the color value of each pixel to an intermediate quantization level and then uses temporal dithering to achieve this intermediate levels of color by dithering them into a final quantization level.

Spatial Dithering

Spatial dithering is one of the methods of rendering more depth than the capability of the display, by relying on the human visual system's property of integrating information over spatial region. Human vision can perceive a uniform shade of color, which is the average of the pattern within the spatial region, even when the individual elements of the pattern can be resolved.

For simplicity of description herein, first a dithering to black and white is considered. A dithering mask is defined by an n×m matrix M of threshold coefficients M(i, j). The input image to be halftoned is represented by an h×v matrix I of input gray levels I(i, j). Usually, the size of dithering mask is much smaller than the size of input image, i.e. n,m<<h,v. The output image is a black and white image which contains only two levels, black and white. If black is represented as 0 and white as 1, the output image O is represented by an h×v matrix of 0 and 1. The value of a pixel O(i,j) is determined by the value I(i,j) and the dithering mask M as:

$$O(i, j) = \begin{cases} 0, & \text{if } I(i, j) < M(i \bmod n, j \bmod m), \\ 1, & \text{otherwise.} \end{cases}$$

This black white dithering can easily be extended to multi-level dithering. Here it is assumed that the threshold coefficients of the dithering mask are between 0 and 1 (i.e., 0<M (i,j)<1), and the gray levels of input image I are also normalized to between 0 and 1 (i.e., 0≦I(i,j)≦1). There are multiple quantization levels for the output image O such that each possible input gray level I(i,j) lies between a lower output level represented as ⌊I(i,j)⌋ and an upper output level represented as ⌈I(i,j)⌉. ⌊I(i,j)⌋ is defined as the largest possible quantization level that is less than or equal to I(i,j), and ⌈I(i,j)⌉ is defined as the next level that is greater than ⌊I(i,j)⌋. Thus, the output O(i,j) of the dithering can be defined as:

$$O(i, j) = \begin{cases} \lfloor I(i, j) \rfloor, & \text{if } \dfrac{I(i, j) - \lfloor I(i, j) \rfloor}{\lceil I(i, j) \rceil - \lfloor I(i, j) \rfloor} < M(i \bmod n, j \bmod m), \\ \lceil I(i, j) \rceil, & \text{otherwise.} \end{cases}$$

For color images that contain three components R, G and B, spatial dithering can be carried out independently for all the three components.

There are two different classes of dithering masks, one is dispersed dot mask and the other is clustered dot mask. Dispersed dot mask is preferred when accurate printing of small isolated pixels is reliable, while the clustered dot mask is needed when the process cannot accommodate the small isolated pixels accurately. According to the present invention, since the display is able to accurately accommodate the pixels, dispersed dot masks are used. The threshold pattern of dispersed dot mask is usually generated such that the generated matrices ensure the uniformity of the black and white across the cell for any gray level. For each gray level, the average value of the dithered pattern is approximately same as the gray level. For Bayer patterns, large size of dithering mask can be formed recursively from the smaller size matrix.

Temporal Dithering

A video display usually displays images at a very high refresh rate, which is high enough such that color fusion occurs in human visual system and the eye does not see the gap between two neighboring frames. Human eyes also have low pass property temporally and thus the video on the display looks continuous when the refresh rate is high enough. This low pass property enables the use of temporal averaging to achieve higher precision perception of colors. Experiments show that when alternatively showing two slightly different colors at a high refresh rate to a viewer, the viewer sees the average color of the two, instead of seeing the two colors alternating. Therefore, a display is able to show more shades of color than its physical capability, given a high refresh rate. For example, Table 1 below shows the use of two frames $f_1$ and $f_2$ to achieve the averaging shades. The first two lines, $f_1$ and $f_2$, are the color values of the two frames, and the third line, Avg, shows the averaging values that might be perceived if the two frames are alternatively shown at a high refresh rate. In this two-frame averaging case, 1 more bit precision of the color shades is achieved.

TABLE 1

Achieving higher precision with temporal averaging of two frames.

| | | | | | | | | |
|---|---|---|---|---|---|---|---|---|
| $f_1$ | 0 | 0 | 1 | 1 | 2 | 2 | 3 | . . . |
| $f_2$ | 0 | 1 | 1 | 2 | 2 | 3 | 3 | . . . |
| Avg | 0 | 0.5 | 1 | 1.5 | 2 | 2.5 | 3 | . . . |

This can be generalized to multi-frame averaging (i.e., more frames are used to represent higher precision colors, when the refresh rate allows). For example, Table 2 below shows the use of three frames $f_1$, $f_2$ and $f_3$ to achieve the intermediate colors as precise as one third of the original color quantization interval.

TABLE 2

Achieving higher precision with temporal averaging of three frames.

| | | | | | | | | |
|---|---|---|---|---|---|---|---|---|
| $f_1$ | 0 | 0 | 0 | 1 | 1 | 1 | 2 | . . . |
| $f_2$ | 0 | 0 | 1 | 1 | 1 | 2 | 2 | . . . |
| $f_3$ | 0 | 1 | 1 | 1 | 2 | 2 | 2 | . . . |
| Avg | 0 | 0.33 | 0.66 | 1 | 1.33 | 1.66 | 2 | . . . |

Assuming the ability to use f frames, the smallest perceivable difference will then become 1/f of the original quantization interval, and the perceivable bit depth of the display will increase by $\log_2 f$. For example, if the display has 8-bits per channel, and two frame averaging is used, the display will be able to display $8+\log_2 2=9$ bits per channel.

Now we describe an example algorithm for this temporal dithering. The same notation as in previous section is used, but the input images I are now image sequences with additional dimension on frame number t, and the output pixel value O(i,j,t) can be determined based on the input pixel I(i,j,t) and the number of the frames for averaging, f, as:

$$O(i, j, t) = \begin{cases} \lfloor I(i, j, t) \rfloor, & \text{if } \dfrac{I(i, j), t - \lfloor I(i, j, t) \rfloor}{\lceil I(i, j, t) \rceil - \lfloor I(i, j, t) \rfloor} < \dfrac{t \bmod f}{f} \\ \lceil I(i, j, t) \rceil, & \text{otherwise.} \end{cases}$$

The function of temporal averaging is constrained by the following known attributes of human visual system. When two colored lights are exchanged or flickered, the color will appear to alternate at low flicker rates, but when the frequency is raised to 15-20 Hz, color flicker fusion occurs, where the flicker is seen as a variation of intensity only. The viewer can eliminate all sensation of flicker by balancing the intensities of the two lights (at which point the lights are said to be equiluminant).

Accordingly, there are two major constraints: (1) the refresh rate of the display, and (2) the luminance difference of the alternating colors. For the first constraint, an alternating rate of at least 15-20 Hz is needed to start the color flicker fusion, which limits the number of frames to be used for temporal averaging and therefore limits the achievable perceptual bit-depth. As most of the HDTV progressive scan has refresh rate at 60 Hz, the frame numbers that can be used for temporal averaging is limited to 3 or 4 frames. For the second constraint, the luminance difference of the alternating colors should be minimized to reduce the flickering after the color flicker fusion happens.

Optimization of Parameters

Referring back to Tables 1 and 2, it is noted that there are different possibilities of assigning the values for different frames to achieve a temporally averaged perception of color. For example, the value 0.5 can be achieved not only by assigning $f_1=0$, $f_2=1$ as shown in Table 1, but also by assigning $f_1=1$, $f_2=0$. If we further consider that the color display can independently control three color channels: red, green and blue (R,G,B), there are additional different choices for achieving the same temporally averaged perception of color. For example, Table 3 below shows two of the possibilities of achieving a color $C_0=(0.5,0.5,0.5)$.

TABLE 3

Temporal averaging with three color components.

| | R | G | B |
|---|---|---|---|
| Case 1 | | | |
| $f_1$ | 0 | 0 | 0 |
| $f_2$ | 1 | 1 | 1 |
| Avg | 0.5 | 0.5 | 0.5 |
| Case 2 | | | |
| $f_1$ | 0 | 1 | 0 |
| $f_2$ | 1 | 0 | 1 |
| Avg | 0. | 0.5 | 0.5 |

Knowing the attributes of human visual system, the possible flickering effects can be reduced by balancing the luminance values of alternating colors, whereby from all the temporal color combinations that can be averaged to achieve the desired color, the one minimizing the luminance changes is selected.

Luminance Y can be derived from the red, green and blue components as a linear combination Y=L(R,G,B). The relationship between luminance and the three components (R,G,B) is device dependent. Different physical settings of the display may have different primaries and different gains. For NTSC standard, Y is defined as:

$$Y=L_{NTSC}(R,G,B)=0.299*R+0.587*G+0.114*B,$$

whereas HDTV video defines Y as:

$$Y=L_{HDTV}(R,G,B)=0.2125*R+0.7154*G+0.0721*B.$$

Assuming the display is compatible to NTSC standard, the luminance difference $\delta Y_1$ and $\delta Y_2$ for the two cases shown in Table 3 can be determined as:

$$\begin{aligned}\delta Y_1 &= |Y_{11} - Y_{12}| \\ &= |0.299(0-1) + 0.587(0-1) + 0.114(0-1)| \\ &= 1,\end{aligned}$$

$$\begin{aligned}\delta Y_2 &= |Y_{21} - Y_{22}| \\ &= |0.299(0-1) + 0.587(1-0) + 0.114(0-1)| \\ &= 0.174.\end{aligned}$$

The value $\delta Y_2$ is much smaller than $\delta Y_1$ and thus the flickering, if perceivable, should be much less for the second case.

Assuming that f frames are used to obtain $\log_2 f$ more precision for color depth, and the input color (r,g,b) has already been quantized to this precision, the values $(R_t,G_t,B_t)$ for each frame t need to be determined, where $1 \leqq t \leqq f$ and (r,g,b) has higher resolution than (R,G,B), such that:

$$\frac{1}{f}\sum_{t=1}^{f} R_t = r, \tag{1}$$

$$\frac{1}{f}\sum_{t=1}^{f} G_t = g, \quad \text{and} \tag{2}$$

$$\frac{1}{f}\sum_{t=1}^{f} B_t = b. \tag{3}$$

There are many different sets of values $RGB=\{(R_i,G_i,B_i), 1 \leqq i \leqq f\}$ that satisfy the above relations (1), (2) and (3). All the possible solutions for said relations can be defined as a solution set D, where $$D = \{(R_i, G_i, B_i),\ 1 \le i \le f\} \Big| \frac{1}{f}\sum_{t=1}^{f} R_t = r,\ \frac{1}{f}\sum_{t=1}^{f} G_t = g,\ \frac{1}{f}\sum_{t=1}^{f} B_t = b\}.$$

To balance the luminance of the f frames of different colors, the set of $RGB=\{(R_i,G_i,B_i), 1 \leqq i \leqq f\}$ is selected as:

$$RGB = \arg\min_{RGB\in D}\max_{1\le u,v\le f} |L(R_u, G_u, B_u) - L(R_v, G_v, B_v)|,$$

which is equivalent to:

$$RGB = \arg\min_{RGB\in D}\left(\max_{1\le t\le f} L(R_t, G_t, B_t) - \min_{1\le t\le f} L(R_t, G_t, B_t)\right),$$

so that the maximum luminance difference within the set RGB is minimized.

In fact, there are many possible solutions in the set D and the maximal luminance difference can be minimized to a very small value. When the size of the temporal dithering (i.e., the frame number f) is fixed, the number of possibilities depends on the range of the temporal dithering (i.e., how much difference is allowed between the color values $(R_t,G_t,B_t)$ and the input color (r,g,b)). The larger the range of allowed difference, the smaller the luminance difference that can be achieved.

In one example, three frames are used to represent RGB value (128.333, 128.333, 128.667) on an 8-bit display. First, only the smallest variation from the input values is allowed (i.e., 128 and 129), for each color component. The best possible combination of the three frames of colors are shown in Case 1 of Table 4 below, wherein the maximum luminance difference of the three frames is 0.299.

TABLE 4

Comparison of different combinations.

| | R | G | B | Y |
|---|---|---|---|---|
| Case 1 | | | | |
| $f_1$ | 128 | 128 | 129 | 128.1 |
| $f_2$ | 128 | 129 | 128 | 128.5 |
| $f_3$ | 129 | 128 | 129 | 128.4 |
| Avg | 128 | 128.3 | 128.6 | |
| max(δY) | | | | 0.299 |
| Case 2 | | | | |
| $f_1$ | 127 | 129 | 129 | 128.4 |
| $f_2$ | 129 | 128 | 128 | 128.2 |
| $f_3$ | 129 | 128 | 129 | 128.4 |
| Avg | 128 | 128.3 | 128.6 | |
| max(δY) | | | | 0.114 |

However, if the range of the values is broadened to 127, 128 and 129, the best combination is shown as Case 2 in Table 4, wherein the maximum luminance difference is reduced to 0.114.

Therefore, broadening the range enables further reduction of the luminance difference, whereby perceived flickering is reduced. However, as mentioned, the relationship between the color components and their luminance values is device dependent. There may be different settings of color temperature, color primaries, individual color gains for different displays, such that the relationship between luminance and three color values may become uncertain. It is preferable to use the smallest range of color quantization levels, since the luminance difference will then be less affected by the display settings, and the minimization of luminance difference basically works for all displays, even it is optimized based only on NTSC standard.

In this case, the range of color values is constrained as: $R_i \in \{\lfloor r \rfloor, \lceil r \rceil\}$, $G_i \in \{\lfloor g \rfloor, \lceil g \rceil\}$, $B_i \in \{\lfloor b \rfloor, \lceil b \rceil\}$. For each color component, there are up to 2 different possibilities of assignment for f=2 and up to 3 different possibilities for f=3. In general, when using f frames for temporal averaging, there are up to $$N = \begin{pmatrix} f \\ \left\lfloor \frac{f}{2} \right\rfloor \end{pmatrix}$$

different possibilities. Considering the three color components, the total alternatives are up to $N^3$.

For the luminance difference ΔY:

$$\begin{aligned} \Delta Y &= |L(R_u, G_u, B_u) - L(R_v, G_v, B_v)| \\ &= |L(\lfloor r \rfloor + \delta r_u, \lfloor g \rfloor + \delta g_u, \lfloor b \rfloor + \delta b_u) - L(\lfloor r \rfloor + \delta r_v, \lfloor g \rfloor + \delta g_v, \lfloor b \rfloor + \delta b_v)| \\ &= |L(\delta r_u - \delta r_v, \delta g_u - \delta g_v, \delta b_u - \delta b_v)| \end{aligned}$$

where $\delta r_u, \delta g_u, \delta b_u, \delta r_v, \delta g_v, \delta b_v \in \{0,1\}$ the optimizing process is independent of the values ($\lfloor r \rfloor, \lfloor g \rfloor, \lfloor b \rfloor$). Therefore, in the optimizing process only ($r-\lfloor r \rfloor, g-\lfloor g \rfloor, b-\lfloor b \rfloor$) are considered for the triples (r,g,b). For input colors that are already quantized to the precision of 1/f, a mapping is constructed from possible ($r-\lfloor r \rfloor, g-\lfloor g \rfloor, b-\lfloor b \rfloor$) values, with dimension (f+1)×(f+1)×(f+1), to the luminance difference minimizing augment $(\delta r_t, \delta g_t, \delta b_t)$, t=1, . . . ,f, (with the dimension of f×3, so that there is no need for the optimization step for each input color.

The above optimization process minimizes the luminance difference between each frame of a particular pixel. Indeed, a frame usually contains many pixels, and flickering effect will be strengthened if a small patch of the same color is dithered using the same set of optimized parameters among frames. This is because the luminance difference between frames, though minimized pixel-wise, is integrated together over a pixel neighborhood. To further reduce the possible flickering, the orders of the minimizing augments $(\delta r_t, \delta g_t, \delta b_t)$, t=1, . . . ,f computed above are spatially distributed. For a temporal dithering with f frames, there are f! different orders. These different orders are distributed to neighboring clusters of f! pixels so that for each cluster, each frame has the integrated luminance as:

$$L\left((f-1)! \cdot \sum_{t=1}^{f} \delta r_t, (f-1)! \cdot \sum_{t=1}^{f} \delta g_t, (f-1)! \cdot \sum_{t=1}^{f} \delta b_t\right),$$

and the integrated luminance difference is therefore reduced to 0 for this cluster of neighboring pixels. Different value for f may lead to different arrangement of spatial distribution of temporal dithering parameters. For example, when f=2, there are f!=2 different orders. If we denote these two orders as 0 and 1, wherein the spatial distribution can then be of following two-dimensional pixel format:

| | |
|---|---|
| 0 | 1 |
| 1 | 0 |

Further, every two neighboring pixels, if regarded as a cluster of pixels, have the integrated luminance difference as 0.

Super Dithering

The spatial and temporal properties of human visual system were discussed, and methods to utilize these properties independently to achieve perceptually higher precision bit depth for color displays were presented. In this section, a super dithering method that combines spatial and temporal dithering according to an embodiment of the present invention is described. The super dithering method first uses a 2D dithering mask to dither the high precision color values to intermediate quantization levels. Then, it uses temporal averaging to achieve the intermediate quantization levels.

Below a super dithering algorithm for a 2D spatial dithering mask M with size m×n and f frames temporal dithering on a limited bit depth display, whose quantization interval is assumed to be 1, is detailed. FIG. 1A shows an example block diagram of a color quantization system 100 according to the present invention which implements said super dithering method to quantize an input color signal to a predefined quantization level of output signal. A decomposition block 102 decomposes the pixels' three color components into three parts: output quantization level values (R, G, B), intermediate quantization level augments $(l_r, l_g, l_b)$ and residues $(e_r, e_g, e_b)$. A spatial dithering block 104 computes dithering result $d_r$, $d_g$, $d_b$ based on the residues $(e_r, e_g, e_b)$, the pixel's spatial position (i,j) and a dithering mask M. A summation block 108 updates the computed intermediate quantization level augments $(l_r, l_g, l_b)$ to a new intermediate quantization level augments $l_r', l_g', l_b'$ based on the dithering result $(d_r, d_g, d_b)$. A modulation block 105 takes the spatial position (i,j) and temporal position t of a pixel as input to compute a modulated frame index t'. Using a look-up table block 106, based on the values of $l_r', l_g', l_b'$, and modulated frame index, the three output quantization level augments $(\delta r_t, \delta g_t, \delta b_t)$ in the mapping F constructed by optimization are obtained. The summation block 110 computes the output pixel O(i,j,k)={R',G',B'} as $R'=R+\delta r_t$, $G'=G+\delta g_t$, and $B'=B+\delta b_t$.

Figure 1B:
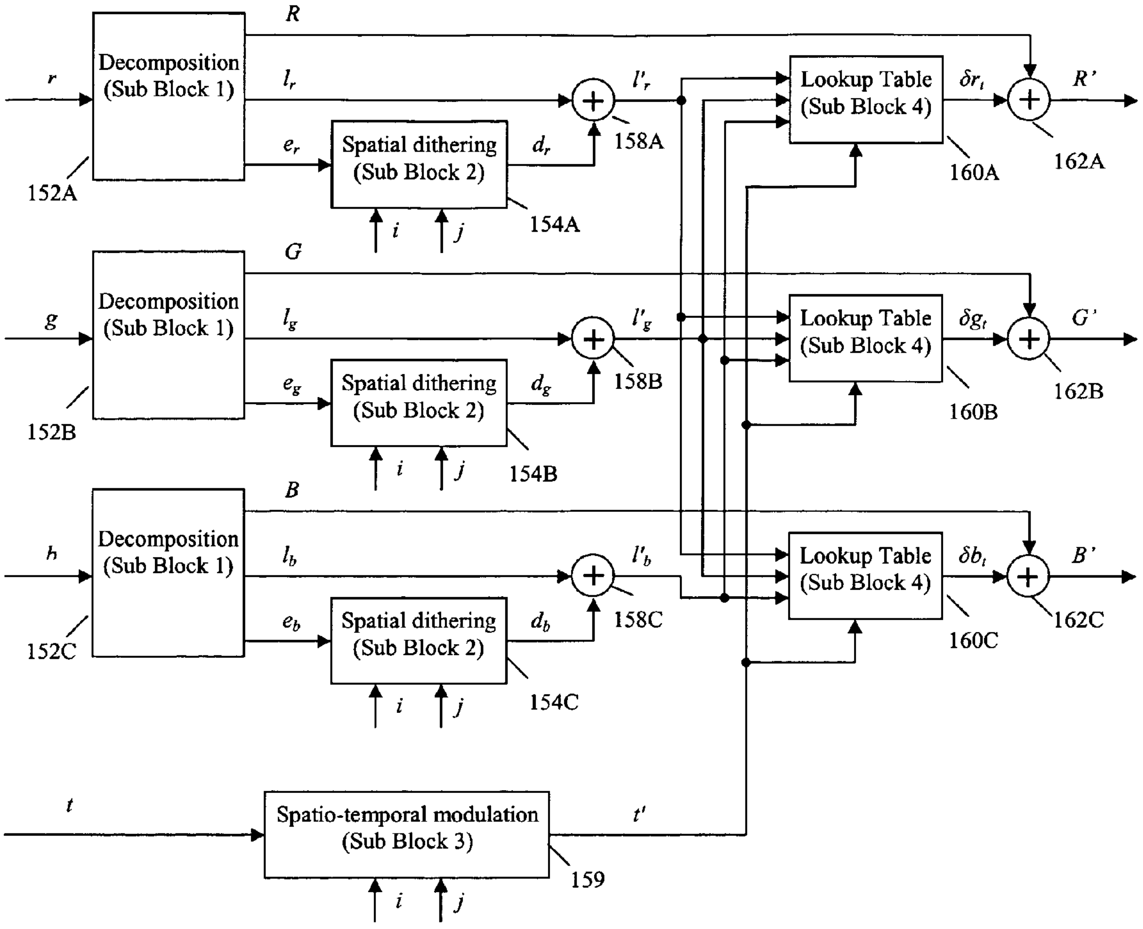
FIG. 1B shows a more detailed diagram of the color quantization system of FIG. 1A.

FIG. 1B shows a color quantization system 150 which is a more detailed version of the color quantization system 100 of FIG. 1A. The example system 150 includes three decomposition blocks (152A, 152B and 152C), three spatial dithering blocks (154A, 154B and 154C), and three lookup table blocks (160A, 160B and 160C) for each input component, in addition to a spatio-temporal modulation block 159. The color quantization system 150 is described below.

1. Optimization. This step is performed offline to determine the lookup table used in blocks 160A, 160B and 160C. Based on the frame number f for temporal dithering and the range S allowed for manipulation of the color values, construct the luminance difference minimizing mapping F:(f+1)×(f+1)×(f+1)→(f×3), from the possible intermediate levels $l_r', l_g', l_b'$, where each component of input colors can take a value from 0 to f (thus the dimension is (f+1)×(f+1)×(f+1)), to a set of output color values $\delta rgb=\{(\delta r_t, \delta g_t, \delta b_t), t=1, \ldots, f\}$, with dimension (f×3), as follows:

$$\delta rgb = \arg\min_{\substack{\delta r_t, \delta g_t, \delta b_t \in S \text{ for all } t \\ \frac{1}{f}\sum_{t=1}^{f}\delta r_t = l_r' \\ \frac{1}{f}\sum_{t=1}^{f}\delta g_t = l_g' \\ \frac{1}{f}\sum_{t=1}^{f}\delta b_t = l_b'}} \left( \max_{1\le t\le f} L(\delta r_t, \delta g_t, \delta b_t) - \min_{1\le t\le f} L(\delta r_t, \delta g_t, \delta b_t) \right)$$

2. Decomposition. For each pixel I(i,j,k)={r,g,b}, a decomposition block 152A, 152B and 152C, respectively, decomposes the pixels' three color components as:

$$r = R + l_r \cdot \frac{1}{f} + e_r,$$

$$g = G + l_g \cdot \frac{1}{f} + e_g,$$

$$b = B + l_b \cdot \frac{1}{f} + e_b,$$

where $R = \lfloor r \rfloor$, $G = \lfloor g \rfloor$, $B = \lfloor b \rfloor$;

$l_r, l_g, l_b \in \{0, 1, \ldots, f-1\}$;

and $e_r, e_g, e_b < \frac{1}{f}$.

3. Spatial dithering. Spatial dithering blocks 154A, 154B, 154C compute $d_r$, $d_g$, $d_b$, respectively, based on the pixel's spatial position (i,j) and the dithering mask M as:

$$d_r = \begin{cases} 0, & \text{if } e_r \cdot f < M(i \bmod n,\ j \bmod m), \\ 1, & \text{otherwise,} \end{cases}$$

$$d_g = \begin{cases} 0, & \text{if } e_g \cdot f < M(i \bmod n,\ j \bmod m), \\ 1, & \text{otherwise,} \end{cases}$$

$$d_b = \begin{cases} 0, & \text{if } e_g \cdot f < M(i \bmod n,\ j \bmod m), \\ 1, & \text{otherwise.} \end{cases}$$

4. Summation I. Summation blocks 158A, 158B, 158C compute $l_r', l_g', l_b'$, respectively, based on the dithering result $(d_r, d_g, d_b)$ and the computed $(l_r, l_g, l_b)$ as:

$$l_r' = l_r + d_r,$$

$$l_g' = l_g + d_g,$$

$$l_b' = l_b + d_b,$$

5. Spatio-temporal modulation block 159 takes the spatial position (i,j) and temporal position t of a pixel as input to compute a modulated frame index t'. This block first performs spatial modulation on (i,j) to obtain an index of order and then reorders the frame number based on the resulting index. An example embodiment of the spatio-temporal modulation for three frame temporal dithering is shown in Table 5 and Table 6 below. There are 3!=6 different orders and the index of order depends on the spatial location (i,j) as shown in Table 5. Each 3×2 block contains six different orders. This spatial distribution example can be expressed as:

$$\text{index}=(i+8\cdot j) \bmod 6.$$

TABLE 5

An example embodiment of ordering index based on spatial location

| | i mod 6 | | | | | |
|---|---|---|---|---|---|---|
| j mod 3 | 0 | 1 | 2 | 3 | 4 | 5 |
| 0 | 0 | 1 | 2 | 3 | 4 | 5 |
| 1 | 2 | 3 | 4 | 5 | 0 | 1 |
| 2 | 4 | 5 | 0 | 1 | 2 | 3 |

For each of the six indices, the re-ordered frame number is shown in Table 6 below.

TABLE 6

An example embodiment of ordering and its index

| | Index = 0 | Index = 1 | Index = 2 | Index = 3 | Index = 4 | Index = 5 |
|---|---|---|---|---|---|---|
| f mod 3 = 0 | 0 | 1 | 2 | 0 | 1 | 2 |
| f mod 3 = 1 | 2 | 2 | 1 | 1 | 0 | 0 |
| f mod 3 = 2 | 1 | 0 | 0 | 2 | 2 | 1 |

6. Temporal dithering. Using look-up table blocks 160A, 160B, 160C, based on the values of $l_r', l_g', l_b'$, and reordered frame index, the three color value augments $(\delta r_t, \delta g_t, \delta b_t)$, respectively, in the mapping F constructed by optimization above, are obtained.

7. Summation II. The summation blocks 162A, 162B, 162C compute the output pixel $O(i,j,k)=\{R',G',B'\}$ as $R'=R+\delta r_t$, $G'=G+\delta g_t$, and $B'=B+\delta b_t$, respectively.

In one example embodiment of the present invention, the spatial dithering mask are selected as follows:

$$M = \begin{bmatrix} 2 & 16 & 3 & 13 \\ 10 & 6 & 11 & 7 \\ 4 & 14 & 1 & 15 \\ 12 & 8 & 9 & 5 \end{bmatrix}.$$

At the same time, the frame number allowed for temporal averaging is set as 3, and the ranges of the color values that are allowed for a color signal (r, g, b) are $\{\lfloor r\rfloor,\lfloor r\rfloor+1\},\{\lfloor g\rfloor,\lfloor g\rfloor+1\},\{\lfloor b\rfloor,\lfloor b\rfloor+1\}$ respectively (i.e., the augment $(\delta r_t,\delta g_t,\delta b_t)$ can only have value 0 or 1). Consequently, $l_r',l_g',l_b'$ can take values of 0, 1, 2, 3, and the mapping from $(l_r',l_g',l_b')$ to $(\delta r_t, \delta g_t,\delta b_t)$ is a mapping of dimensions $4\times4\times4\rightarrow3\times3$. Example Table 7 below shows a lookup table generated based on the NTSC standard. Each segment in Table 7 is the 3×3 output, while there are 4×4×4 segments in Table 5 referring to each possible $(l_r',l_g',l_b')$. The symbol $r_0g_0b_0r_1g_1b_1r_2g_2b_2$ means the corresponding $(\delta r_t,\delta g_t,\delta b_t)$ in the three frames depending on the result of spatio-temporal modulation. For example, if $l_r'=1$, $l_g'=1$ and $l_b'=1$, the corresponding $r_0g_0b_0r_1g_1b_1r_2g_2b_2=(0,0,1,0,1,0,1,0,0)$. Therefore for the reordered frame number t'=0, the output $(\delta r_t,\delta g_t,\delta b_t)=(0,0,1)$.

pares the 4-bit input (e.g., $e_r$, $e_g$ or $e_b$) with the selected threshold from the selector 304, to generate a 1-bit output data (e.g., output is 0 if 4-bit input is less than the selected threshold, and 1 otherwise).

Figure 4:
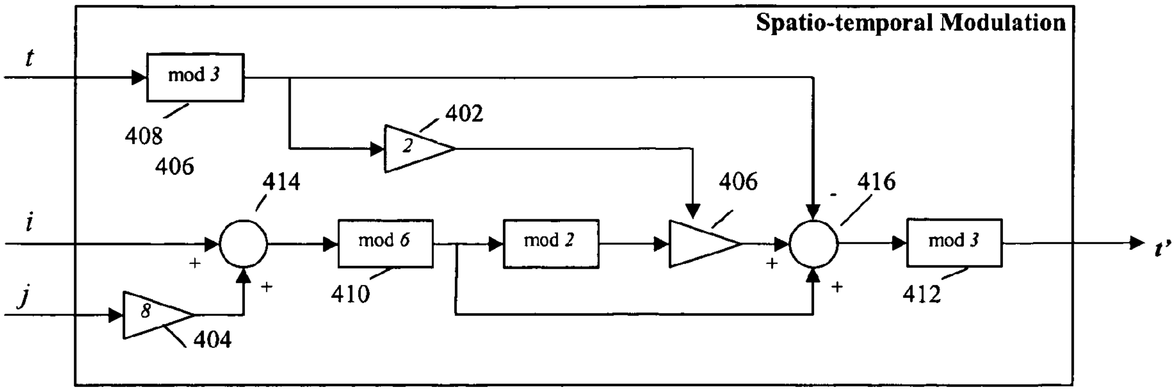
FIG. 4 shows an example block diagram of an embodiment of a spatio-temporal modulation block in FIG. 1B.

FIG. 4 shows an example block diagram of a function 400 which is an embodiment of the spatio-temporal modulation block 159 in FIG. 1B. The input includes the spatial location (i, j) and the temporal location t, the pixel and the output is the modulated value t' using a multiple-by-2 block 402, a multiply-by-8 block 404, a multiply block 406, mod blocks 408, 410, 412 and add/subtract blocks 414, 416.

Figure 5:
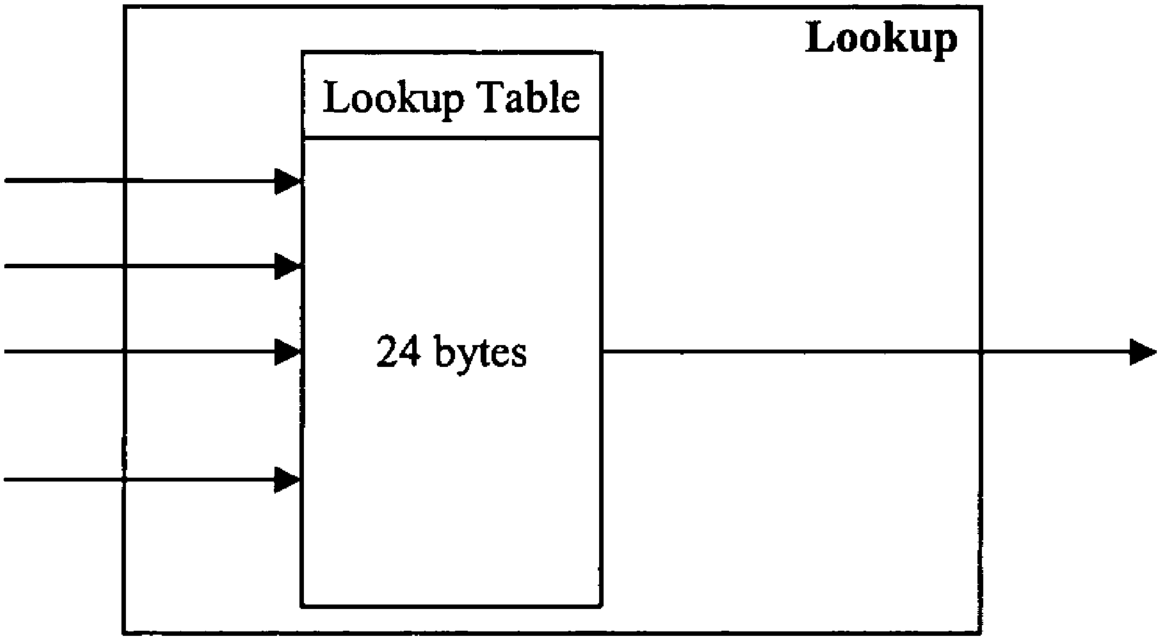
FIG. 5 shows an example block diagram of an embodiment of a lookup table block in FIG. 1B.

FIG. 5 shows an example block diagram of a function 500 which is an embodiment of a lookup table block 160A (160B or 160C) in FIG. 1B.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for video processing, comprising:

receiving an input color RGB signal comprising spatial and temporal positions of a plurality of pixels;

quantizing the input color RGB signal into a quantized RGB signal having an intermediate quantization level; and

TABLE 7

An example embodiment of lookup table for three frames

| $l_b'$ | $l_g'$ | $l_r' = 0$ $r_0g_0b_0r_1g_1b_1r_2g_2b_2$ | $l_r' = 1$ $r_0g_0b_0r_1g_1b_1r_2g_2b_2$ | $l_r' = 2$ $r_0g_0b_0r_1g_1b_1r_2g_2b_2$ | $l_r' = 3$ $r_0g_0b_0r_1g_1b_1r_2g_2b_2$ |
|---|---|---|---|---|---|
| 0 | 0 | 0, 0, 0, 0, 0, 0, 0, 0, 0, | 0, 0, 0, 0, 0, 0, 1, 0, 0, | 0, 0, 0, 1, 0, 0, 1, 0, 0, | 1, 0, 0, 1, 0, 0, 1, 0, 0, |
| | 1 | 0, 0, 0, 0, 0, 0, 0, 1, 0, | 0, 0, 0, 0, 1, 0, 1, 0, 0, | 0, 1, 0, 1, 0, 0, 1, 0, 0, | 1, 0, 0, 1, 0, 0, 1, 1, 0, |
| | 2 | 0, 0, 0, 0, 1, 0, 0, 1, 0, | 0, 1, 0, 0, 1, 0, 1, 0, 0, | 0, 1, 0, 1, 0, 0, 1, 1, 0, | 1, 0, 0, 1, 1, 0, 1, 1, 0, |
| | 3 | 0, 1, 0, 0, 1, 0, 0, 1, 0, | 0, 1, 0, 0, 1, 0, 1, 1, 0, | 0, 1, 0, 1, 1, 0, 1, 1, 0, | 1, 1, 0, 1, 1, 0, 1, 1, 0, |
| 1 | 0 | 0, 0, 0, 0, 0, 0, 0, 0, 1, | 0, 0, 0, 0, 0, 1, 1, 0, 0, | 0, 0, 1, 1, 0, 0, 1, 0, 0, | 1, 0, 0, 1, 0, 0, 1, 0, 1, |
| | 1 | 0, 0, 0, 0, 0, 1, 0, 1, 0, | 0, 0, 1, 0, 1, 0, 1, 0, 0, | 0, 1, 0, 1, 0, 0, 1, 0, 1, | 1, 0, 0, 1, 0, 1, 1, 1, 0, |
| | 2 | 0, 0, 1, 0, 1, 0, 0, 1, 0, | 0, 1, 0, 0, 1, 0, 1, 0, 1, | 0, 1, 0, 1, 0, 1, 1, 1, 0, | 1, 0, 1, 1, 1, 0, 1, 1, 0, |
| | 3 | 0, 1, 0, 0, 1, 0, 0, 1, 1, | 0, 1, 0, 0, 1, 1, 1, 1, 0, | 0, 1, 1, 1, 1, 0, 1, 1, 0, | 1, 1, 0, 1, 1, 0, 1, 1, 1, |
| 2 | 0 | 0, 0, 0, 0, 0, 1, 0, 0, 1, | 0, 0, 1, 0, 0, 1, 1, 0, 0, | 0, 0, 1, 1, 0, 0, 1, 0, 1, | 1, 0, 0, 1, 0, 1, 1, 0, 1, |
| | 1 | 0, 0, 1, 0, 0, 1, 0, 1, 0, | 0, 0, 1, 0, 1, 0, 1, 0, 1, | 0, 1, 0, 1, 0, 1, 1, 0, 1, | 1, 0, 1, 1, 0, 1, 1, 1, 0, |
| | 2 | 0, 0, 1, 0, 1, 0, 0, 1, 1, | 0, 1, 0, 0, 1, 1, 1, 0, 1, | 0, 1, 1, 1, 0, 1, 1, 1, 0, | 1, 0, 1, 1, 1, 0, 1, 1, 1, |
| | 3 | 0, 1, 0, 0, 1, 1, 0, 1, 1, | 0, 1, 1, 0, 1, 1, 1, 1, 0, | 0, 1, 1, 1, 1, 0, 1, 1, 1, | 1, 1, 0, 1, 1, 1, 1, 1, 1, |
| 3 | 0 | 0, 0, 1, 0, 0, 1, 0, 0, 1, | 0, 0, 1, 0, 0, 1, 1, 0, 1, | 0, 0, 1, 1, 0, 1, 1, 0, 1, | 1, 0, 1, 1, 0, 1, 1, 0, 1, |
| | 1 | 0, 0, 1, 0, 0, 1, 0, 1, 1, | 0, 0, 1, 0, 1, 1, 1, 0, 1, | 0, 1, 1, 1, 0, 1, 1, 0, 1, | 1, 0, 1, 1, 0, 1, 1, 1, 1, |
| | 2 | 0, 0, 1, 0, 1, 1, 0, 1, 1, | 0, 1, 1, 0, 1, 1, 1, 0, 1, | 0, 1, 1, 1, 0, 1, 1, 1, 1, | 1, 0, 1, 1, 1, 1, 1, 1, 1, |
| | 3 | 0, 1, 1, 0, 1, 1, 0, 1, 1, | 0, 1, 1, 0, 1, 1, 1, 1, 1, | 0, 1, 1, 1, 1, 1, 1, 1, 1, | 1, 1, 1, 1, 1, 1, 1, 1, 1, |

Figure 2:
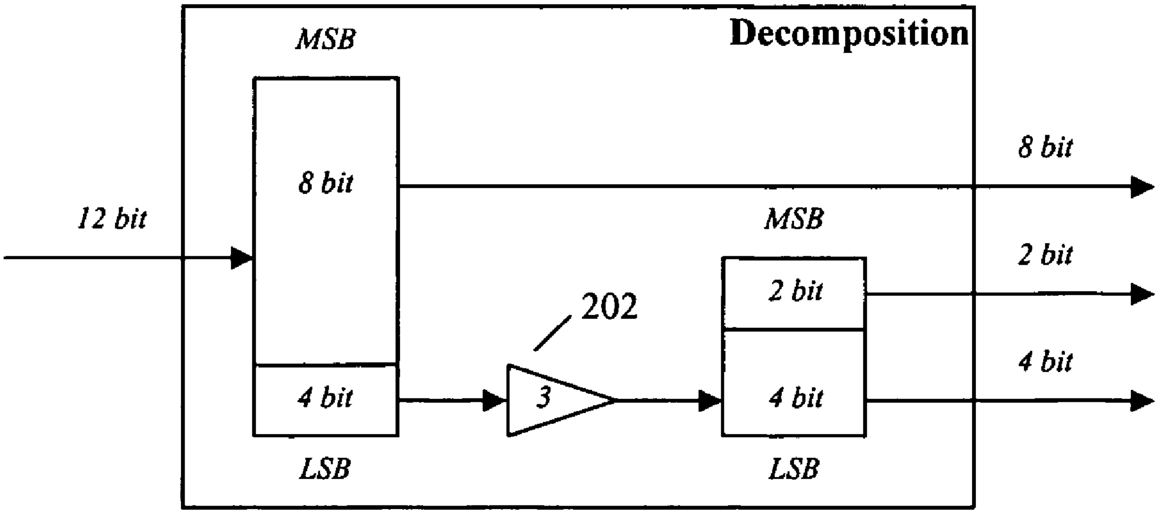
FIG. 2 shows an example block diagram of an embodiment of a decomposition block in FIG. 1B.

FIG. 2 shows an example block diagram of a logic function 200 which is embodiment of a decomposition block 152A (152B or 152C) in FIG. 1B. The logic function 200 separates a 12-bit data input into three data outputs as 8-bit, 2-bit and 4-bit depth. The most significant 8 bits of the input data is output directly as the 8-bit output of the function 200. The least significant 4 bits of the input data is multiplied by 3 in element 202, wherein the most significant 2 bits and the least significant 4 bits of that multiplication result form said 2-bit and 4-bit outputs of function 200, respectively.

Figure 3:
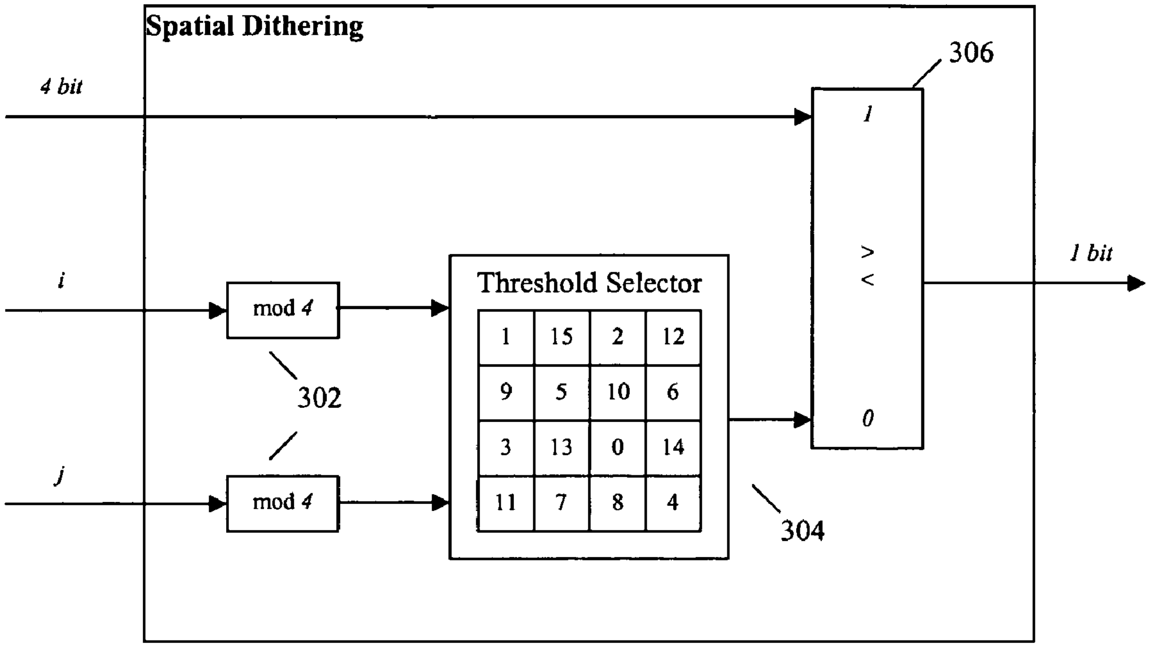
FIG. 3 shows an example block diagram of an embodiment of a spatial dithering block in FIG. 1B.

FIG. 3 shows an example block diagram of a function 300 which is an embodiment of a spatial dithering block 154A (154B or 154C) in FIG. 1B. The input pixel location (i, j) is supplied to mod functions 302, and the result used by a threshold selector 304, wherein a comparison block 306 comfurther quantizing the quantized RGB signal from the intermediate quantization level to a final quantization level based on temporal and spatial positions of the plurality of pixels.

2. The method of claim 1, wherein quantizing the RGB signal to an intermediate quantization level further includes the steps of:

determining the intermediate quantization level;

decomposing the input color RGB signal into three parts (R, G, B) based on the determined intermediate quantization level and the final quantization level; and dithering the least significant part of the decomposed RGB signal into the determined intermediate quantization level.

3. A method for video processing, comprising:

receiving an input color RGB signal comprising RGB of a pixel and its spatial and temporal positions;

quantizing the RGB signal into a quantized RGB signal having an intermediate quantization level; and further quantizing the quantized RGB signal having the intermediate quantization level signal, into a final quantization level based on its temporal position and spatial position, wherein further quantizing the intermediate level RGB signal to the final quantization level comprises:

using color values of the pixel in multiple frames for achieving the intermediate level; and choosing different ordering of the multi-frame pixel values based on the spatial and temporal positions of the pixel.

4. The method of claim 3, wherein using color values of the pixel in multiple frames for achieving the intermediate level comprises assigning color values with the final quantization levels to multiple frames so that an average of the multi-frame colors is the same as said intermediate level.

5. The method of claim 3, wherein using color values of the pixel in multiple frames for achieving the intermediate level comprises assigning color values with the final quantization levels to multiple frames so that an average of the multi-frame colors is the closest possible to the intermediate level.

6. The method of claim 3, wherein using color values of the pixel in multiple frames for achieving the intermediate level comprises essentially minimizing a temporal luminance difference of the values of the pixel in the multiple frames.

7. The method of claim 6, wherein essentially minimizing the temporal luminance difference comprises constructing a lookup table based on a range allowed for temporal dithering, wherein the values in the lookup table essentially minimize the temporal luminance difference.

8. The method of claim 7, wherein the constructed lookup table comprises a lookup table for three frames averaging.

9. The method of claim 1, wherein the quantized RGB signal having the final quantization level provides a perceived video quality on a display with less bit depth of color than the input RGB signal.

10. The method of claim 9, wherein video quality of input video sequences for bit-depth insufficient displays is improved.

11. A video quantization system, comprising:

means for receiving an input color RGB signal representing a pixel and its spatial and temporal positions;

spatial dithering means that applies spatial dithering to the input color RGB signal to generate an intermediate signal; and temporal dithering means that applies data dependent temporal dithering to the intermediate signal to provide a final signal having a final quantization level based on a temporal position and a spatial position of the pixel.

12. The system of claim 11, wherein the spatial dithering means applies a two dimensional (2D) spatial dithering process.

13. The system of claim 11, wherein the temporal dithering means applies a temporal averaging.

14. The system of claim 11, wherein:

color values of a pixel of the input color RGB signal are represented using multiple video frames; and the number of frames considered by the temporal dithering means for each pixel is constrained by a frame rate of an output video display.

15. The system of claim 11, wherein the temporal dithering means applies data dependent temporal dithering such that for different pixel color values and different locations, a temporal dithering scheme is different.

16. The system of claim 11, wherein the perceived video quality on a display with less bit depth of color than the input color is maintained.

17. The system of claim 11, wherein the spatial dithering means quantizes the input color RGB signal into a quantized RGB signal having an intermediate quantization level.

18. The system of claim 11, wherein the temporal dithering means further quantizes quantized RGB input signal from an intermediate quantization level to the final quantization level based on the temporal position and spatial position of the pixel.

* * * * *